United States Patent [19]
Reitboeck

[11] B 3,989,896
[45] Nov. 2, 1976

[54] METHOD AND APPARATUS FOR SPEECH IDENTIFICATION

[75] Inventor: Heribert J. P. Reitboeck, Pittsburgh, Pa.

[73] Assignee: Westinghouse Electric Corporation, Pittsburgh, Pa.

[22] Filed: May 8, 1973

[21] Appl. No.: 358,427

[44] Published under the second Trial Voluntary Protest Program on February 3, 1976 as document No. B 358,427.

[52] U.S. Cl............................................. 179/1 SB
[51] Int. Cl.².................................................. G10L 1/00
[58] Field of Search......... 179/1 SA, 1 SB, 15.55 R; 328/167

[56] References Cited
UNITED STATES PATENTS

| | | | |
|---|---|---|---|
| 2,575,910 | 11/1951 | Mathes | 179/1 SB |
| 2,819,341 | 1/1958 | Barney | 179/1 SA |
| 2,857,465 | 10/1958 | Schroeder | 179/1 SA |
| 3,423,530 | 1/1969 | Coulter | 179/1 SA |
| 3,437,757 | 4/1969 | Coker | 179/1 SA |
| 3,509,280 | 4/1970 | Jones | 179/1 SB |
| 3,700,815 | 10/1972 | Doddington | 179/1 SA |
| 3,787,774 | 1/1974 | Tietze | 328/167 |

FOREIGN PATENTS OR APPLICATIONS

| | | | |
|---|---|---|---|
| 2,019,280 | 11/1970 | Germany | 179/1 SA |

Primary Examiner—Kathleen H. Claffy
Assistant Examiner—E. S. Kemeny
Attorney, Agent, or Firm—M. P. Lynch

[57] ABSTRACT

The use of electronically tunable filters permit an efficient extraction of characteristic speech features, such as pitch frequency and the position of spectral peaks, called formants, that are present in vowels and voiced consonants. A pair of electronically tunable active filters each controlled for CF and Q, are utilized to "lock in" on a particular formant and to follow its inflections. The control voltage supplied to the active filters directly corresponds to the formant position and gives an inexpensive and simple technique for the characterization of voiced phonemes.

12 Claims, 10 Drawing Figures

METHOD AND APPARATUS FOR SPEECH IDENTIFICATION

BACKGROUND OF THE INVENTION

There is a present demand for automatic speaker identification and automatic word recognition systems. The market for speaker identification systems includes security systems, credit sales operations, computer data access, banking activities and law enforcement. Recent studies have confirmed that voice print identification is sufficiently reliable to be used as legal evidence. The advantage of voice print over other techniques such as fingerprint identification is that existing telephone lines can be used to transfer the information through the use of an inexpensive microphone and without the need for expensive conversion equipment at the terminal location.

The market for word recognition systems includes, material handling operations, mail sorting, manufacturing control, automatic checkout for supermarkets, and voice actuated switches. The use of spoken data in the areas of material handling, mail sorting, manufacturing control, and automatic checkout supermarkets frees the hands of the operator to perform other tasks. The potential use of speech recognition for computer data input is an exciting one in that it would permit the use of natural languages for programming the computer thus eliminating the need for developing peculiar language for the computer. This would permit computer input data to be provided by individuals who have no knowledge of the operation of the computer.

A speech recognition system must perform three basic functions:

1. Extract characteristic features of the speech wave, in order to reduce the very large information content of the speech wave to basic information, sufficient for identification of the speaker and/or recognition of the linguistic content.

2. Perform some type of time axis normalization, i.e., to contract or expand a basic linguistic element known as a phonene to a standardized duration, so that the word can be matched with stored information so that it can be recognized independently of how fast the word is spoken or whether parts of it have been stressed.

3. Compare the normalized words with a set of stored words, and indicate the best match.

In present speech recognition systems characteristic features are extracted via a Fourier analaysis or a time series analysis of the speech wave. A subsequent algorithm usually performs phoneme segmentation and time axis normalization. For real time operation, such systems require extensive calculation power generally required to be provided by a full size computer in addition to preprocessing equipment such as filter banks or sampling and timing devices. For most of the potential applications, the cost of such systems is beyond an economically acceptable level.

SUMMARY OF THE INVENTION

The short time power spectrum of vowels and voiced consonants exhibit characteristic frequency peaks that are produced by the cavities of the vocal tract when excited by sound vibrations from the vocal chords.

These frequency peaks are called formants. The position and temporal variations can be used as features for the characterization of voices phonemes and identification of a person speaking.

The simple and inexpensive technique for speaker identification and word recognition disclosed herein with reference to the illustrated preferred embodiment selects the pitch of the voice, together with the frequency of a predetermined number of the lowest spectral peaks (formants) and operates to locate the frequencies and track them. The system utilizes electronically tunable active filters, with variable bandwidth and center frequency, to "lock in" on a particular formant and to follow its inflections. In a particular embodiment, four pairs of electronically tunable active filters are utilized to lock in on the pitch of the spoken information as well as on the first three formants. The control voltage of the filters, which corresponds to the formant frequency, provides a simple technique for characterizing the spoken word elements.

To classify the speech features, the system can make use of a content-addressable semiconductor memory and classification matrix of the type described in detail in U.S. Pat. No. 3,845,471, entitled "Radar Identification System", issued Oct. 29, 1974 and assigned to the assignee of the present invention. The characteristics of the word are compared with the stored information in the memory and classification matrix until a word is selected that best matches the features of the spoken word. Both of these subsystems, the formant tracker and the classification matrix, lend themselves to fabrication by large scale integration techniques. This approach has the potential of bringing speaker identification and vocabulary wordrecognition systems within a price range that is attractive in the consumer market.

DESCRIPTION OF THE DRAWINGS

The invention will become more readily apparent from the following exemplary description in connection with the accompanying drawings.

The spectrum of vowels and voiced consonants usually contains up to five frequency peaks, corresponding to the pitch frequency and four formant frequencies. While the pitch frequency and the first three formant frequencies are normally used for speaker identification, the use of the three formant frequencies alone can generally provide sufficient information for the identification of voiced phonemes.

The frequency range for pitch and formant frequencies for the average male is:

| | | | |
|---|---|---|---|
| pitch | PF | 60 | →240 Hz |
| 1st formant | $F_1$ | 150 | →850 Hz |
| 2nd formant | $F_2$ | 500 | →2500 Hz |
| 3rd formant | $F_3$ | 1500 | →3500 Hz |
| 4th formant | $F_4$ | 2500 | →4500 Hz |

The pitch frequencies of female speakers are approximately one octave higher, and their formant frequencies are about 17% higher than that of males.

DESCRIPTION OF THE PREFERRED EMBODIMENTS

Figure 1:
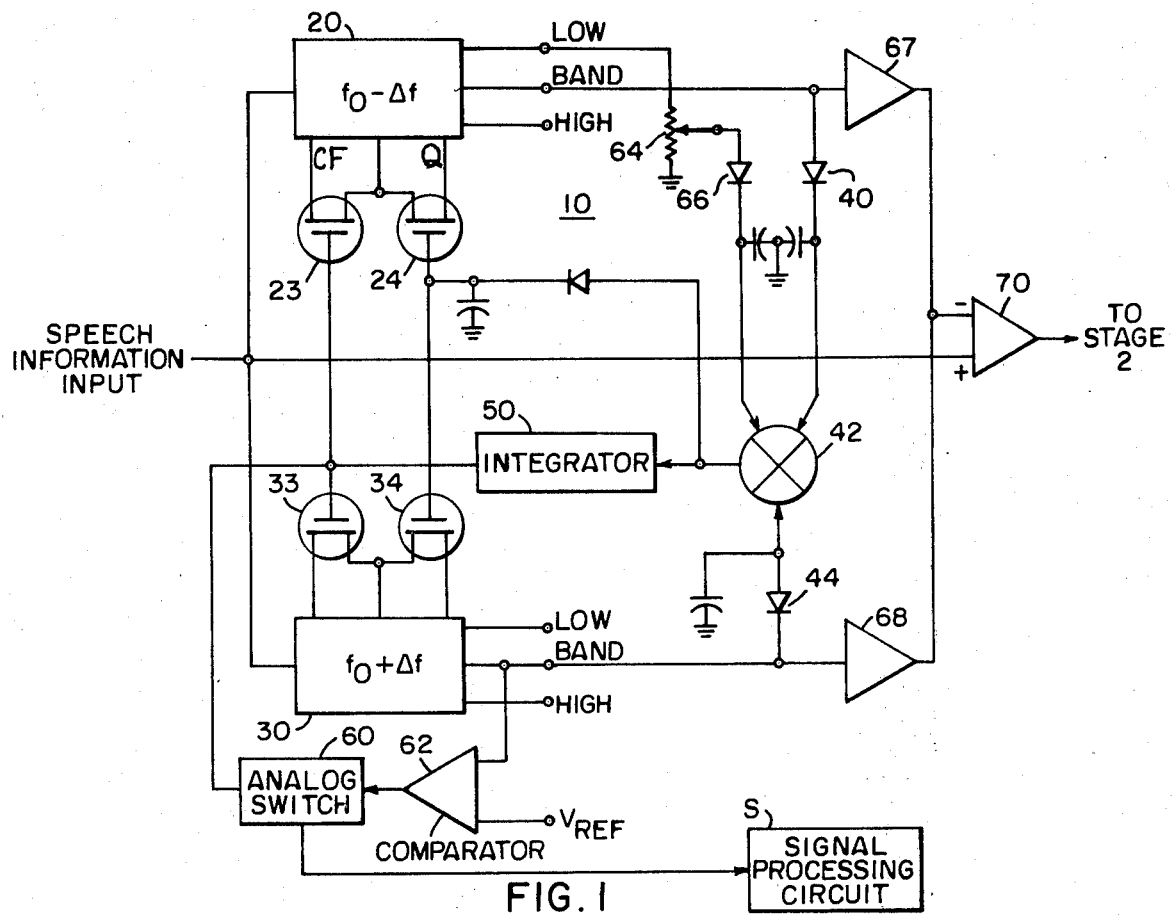
FIG. 1 is a schematic illustration of a formant tracker embodying the invention.

Referring to FIG. 1 there is schematically illustrated a formant tracker 10 comprised of electronically tunable filters 20 and 30. Electronically tunable filters suitable for use in FIG. 1 include the model FS-50 active filter supplied by Kinetic Technology, Inc.

The commercially available electronic tunable active filter of the type illustrated as filters 20 and 30 of FIG. 1 provides high pass, low pass and bandpass transfer functions and bias input capabilities to permit adjustment of the center frequency and Q value of the filter. The adjustment of the center frequency and Q value of the filter is achieved by use of external variable impedance devices which schematically in FIG. 1 have been illustrated to be field effect transistors 23 and 33 for adjusting the center frequency of filters 20 and 30 respectively, and field effect transistors 24 and 34 for adjusting the Q value of the tunable filters 20 and 30 respectively. The adjustment of the center frequency and Q value of the tunable filters is achieved by varying the bias voltage applied to the respective field effect transistors. Suitable results have been achieved through the use of analog multipliers in place of the field effect transistors.

In the illustration of FIG. 1, the filters 20 and 30 are connected in a bandpass mode of operation with tunable filter 20 responding to speech input information exhibiting frequency content corresponding to $f_o - \Delta f$ and the tunable filter 30 responding to speech input information exhibiting frequency in the range $f_o + \Delta f$.

While the following discussion of the use of tunable active filters for analyzing speech information refer to the particular embodiment of FIG. 1 in which both filters are connected in a bandpass mode of operation, it is emphasized that the technique is equally valid for any combination of low pass, bandpass and high pass modes of operation of the pair of tunable filters.

Figure 2:
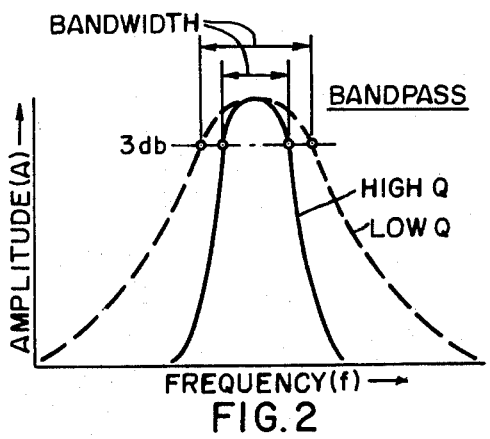
FIGS. 2–4 are illustrations of various filter modes of operation.
Figure 3:
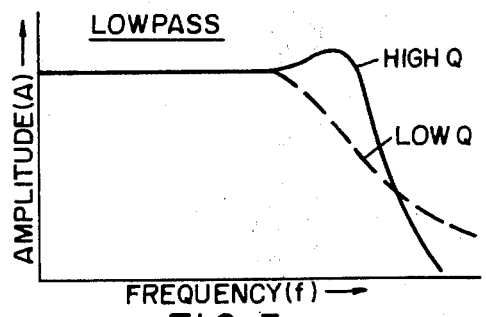
Figure 4:
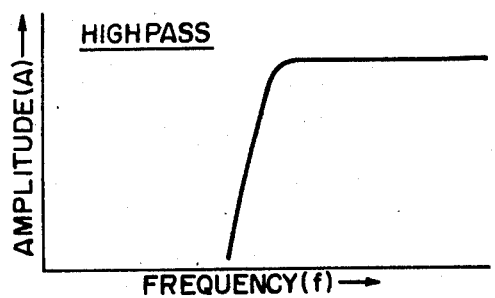
Figure 5:
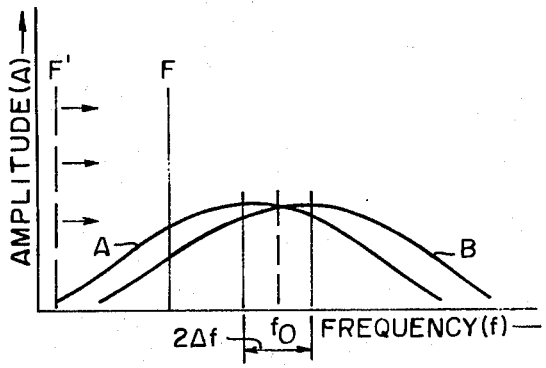
FIGS. 5 and 6 are illustrations of the frequency response of tunable active filters of the embodiment of FIG. 1.
Figure 6:
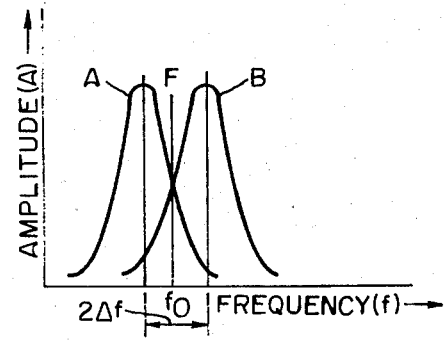
Figure 7:
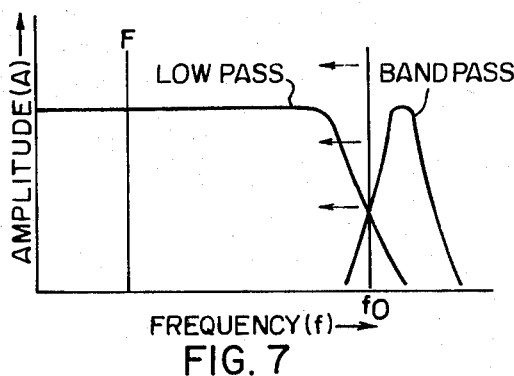
FIG. 7 is a representation of the operation of an alternate embodiment of the circuit of FIG. 1.

In FIG. 2, the amplitude versus frequency plot of a tunable active filter operating in a bandpass mode is illustrated, while FIG. 3 illustrates low pass mode of operation and FIG. 4 the high pass mode of operation. The representation illustrated in dashed lines in FIGS. 2 and 3 represents filters with a relatively low Q in comparison to the high Q value represented by the solid line. FIG. 5 is an illustration of the operation of formant tracker circuit 10 of FIG. 1 wherein both the tunable filters 20 and 30 are operated in a bandpass mode of operation with the waveform A representing tunable filter 20 and the waveform B representing tunable filter 30. When the speech information input contains a formant F within the particular frequency range of the filters 20 and 30, the response of filter 20 will be either larger or smaller than the response of filter 30 depending upon whether the formant frequency F is lower or higher than the center frequency $f_o$. The bandpass output of filter 20 is rectified by rectifier 40 to provide an input to the summing circuit 42 of a first polarity while the bandpass output of filter 30 is rectified by rectifier 44 to provide an opposite polarity input to the summing circuit 42. In the event, the formant F present in the speech information input does not coincide with the frequency $f_o$, as in the situation illustrated in FIG. 5, the bandpass output of the filters 20 and 30 will differ in magnitude and thus the opposite polarity inputs provided by rectifiers 40 and 44 will be of unequal magnitude. The summing circuit 42 supplies an input to the integrating circuit 50 which corresponds to the net difference between the bandpass output signals of filters 20 and 30. This signal developed by the summing circuit 42 is integrated by the integrating circuit 50 which in turn develops an output signal which is utilized to control the conductivity of the field effect transistors 23 and 33 to adjust the center frequency of the filters 20 and 30 respectively. The output signal from integrating circuit 50 will cause the center frequency of the respective filters to be shifted in a direction to achieve coincidence between the center frequency $f_o$ and the formant F as illustrated in FIG. 6. When this coincidence condition is achieved, the bandpass outputs from filters 20 and 30 will be equal thus reducing the output signal from the summing circuit 20 to zero causing the output of integrating circuit 50 to remain constant. The magnitude of the output signal of the integrating circuit 50 is thus indicative of the formant F of the speech input information and is transmitted through analog switch 60 to signal processing circuits. The signal processing circuit can be implemented in accordance with the teachings of the above-cited related application of the inventor which is herein incorporated by reference. As the frequency of the formant F changes, the combined operation of the tunable filters 20 and 30 again functions to maintain the center frequency $f_o$ in coincidence with the formant F and effectively tracks the formant F through the feedback operation provided by the integrating circuit 50. The operation of a tracker circuit using the combination of a low pass filter and a bandpass filter is represented in FIG. 7. Once again the circuit will respond to the deviation of formant frequency F from the frequency $f_o$ by adjusting the center frequency of the filters to coincide with the formant F.

Figure 8:
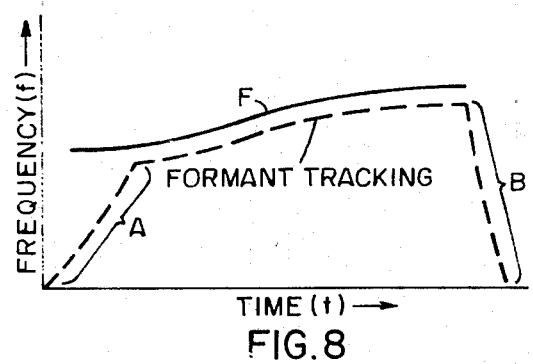
FIG. 8 is a representation of the tracking operation of the circuit of FIG. 1.

The operation of the formant tracker circuit 10 of FIG. 1 is illustrated in FIG. 8. The portion of the formant tracking curve identified as A illustrates the time lag in the circuit prior to reaching the formant F while the portion of the curve identified as B represents the decay time of the formant tracking circuit following conclusion of the tracking of a particular formant F. In order to eliminate the portions of the curve identified as A and B, from being transmitted with the information corresponding to the formant F to the signal processing circuits the output from the integrating circuit 50 is transmitted through analog switch 60. Analog switch 60 is established in the open condition for transmitting the output from the integrating circuit 50 only when a bandpass output of the filter 30 exceeds a predetermined level $V_{ref}$ as established by comparator circuit 62.

The Q value of the filters 20 and 30 is controlled by a bias signal corresponding to the output of the summing circuit 42 which is applied to the field effect transistors 24 and 34 respectively. The effect of varying the Q of the filter as illustrated in FIGS. 2, 5 and 6, is such that a low Q increases the bandwidth of the filter whereas a high Q value decreases the bandwidth of the filter. In order to compensate for formants which occur outside of the response range of the filters 20 and 30 as represented by formant F1 of FIG. 5, a portion of the low pass output of filter 20 as controlled by variable resistor 64 and rectified by diode 66 is supplied as an input to the summing circuit 42. The low pass input serves as a bias signal to shift the formant F' into the responsive range of the filters as illustrated by the arrows of FIG. 5. The description above identifies the operation of a formant tracker for locating and tracking a particular formant of speech input information. However, as indicated above to classify and identify a spoken word or the individual speaker, it is required to analyze several formants within a spoken word thus requiring additional formant trackers of the type illustrated in FIG. 1. There is illustrated in FIG. 9 a cascade arrangement of formant trackers of the type illustrated in FIG. 1.

In order to prevent two or more formant trackers from locking in on the same formant, a special arrangement is used that removes that frequency peak, to which a particular formant tracker tunes itself, from the speech spectrum that is to be analyzed by the subsequent formant trackers. This is accomplished by supplying the speech information input of the first stage directly to the non-inverting input of the operational amplifier 70 and the bandpass outputs from filters 20 and 30 as amplified by amplifiers 67 and 68 to the inverting input of the operational amplifier 70. The input signal to the inverting input of the amplifier 70 represents the spectral content of the speech information input that is within the bandpass transmission range $f_o \pm \Delta F$ of the bandpass outputs of filters 20 and 30. Amplifier 70 subtracts this spectral content from the speech information input and supplies that portion of the speech information input not processed by filters 20 and 30 to a second formant tracker stage as illustrated in FIG. 9. In the second stage the output from the operational amplifier 70 of the first stage is applied simultaneously to the formant tracker of the second stage as well as to the non-inverting input of the operational amplifier 70 of the second stage. The output of the formant tracker 10 of the second stage is applied to the inverting input of the operational amplifier 70 of the second stage. This interconnection scheme is continued throughout the series of trackers as illustrated in FIG. 9. In this interconnection scheme each stage acts as a dynamic notch filter to remove the particular formant to which it is tuned from the input to the subsequent stages.

Figure 9:
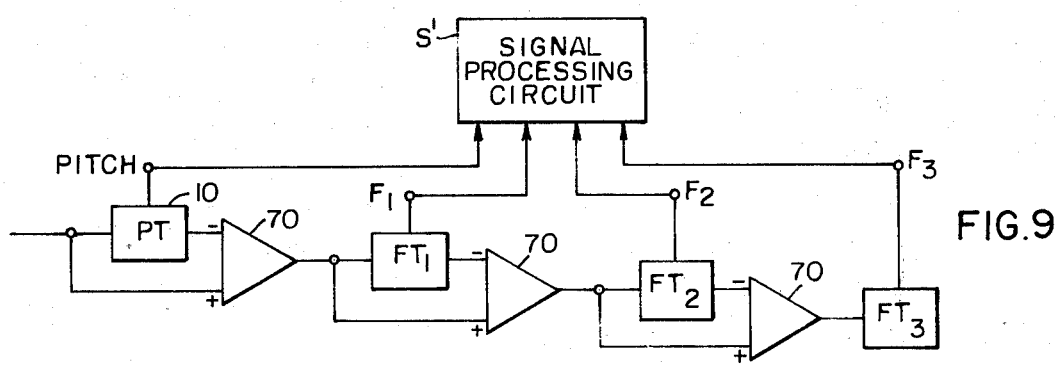
FIG. 9 is a schematic illustration of a combination of formant trackers of the type illustrated in FIG. 1.

In order to make the circuits of the arrangement of FIG. 9 operate in a predetermined sequence, such that the first circuit PT follows the pitch inflections, the second circuit $FT_1$ follows formant $F_1$, the third circuit $FT_2$ follows the second formant $F_2$ and the fourth circuit $FT_3$ follows the formant $F_3$, each tracker is biased to respond to the lowest frequency peak of the input information supplied to it. This is accomplished as illustrated in FIG. 1, by feeding part of the rectified low pass output of the filter 20 together with the bandpass outputs of filters 20 and 30 to the summing circuit 42. The magnitude of the bias is adjusted by the potentiometer 64. It causes the summing network 42 to produce an output signal as long as the filter is not centered on the lowest frequency peak that is present in the spectrum.

As indicated above, the Q value of the filters 20 and 30 is originally low, such that the frequency peak to which they respond falls within their bandwidth. No scanning mode of the filters 20 and 30 is therefore required to find spectral peaks. When the formant tracker 10 locks in on a frequency peak, its bandpass output signal increases, and this voltage in turn functions to increase the Q value of the filters, via the field effect transistors 24 and 34, until a minimal bandwidth of say between 100 and 200 Hertz is reached. The tracking operation of the circuit 10 is such as to permit the resolution to two formants that fall together. One formant tracker functions to follow the low frequency edge of this formant and remove a 100 or 200 Hertz wide band of the spectrum, while the other tracker stage follows the remaining or upper half of the broad frequency peak.

As noted in FIG. 9 each of the tracker circuits provides an output signal corresponding to the output of the respective integrating circuit of each tracker circuit. This output signal is representative of the formant being tracked by the respective tracking circuit and is subsequently supplied to the signal processing circuits for correlation with the outputs of each of the other formant trackers to provide information for identification of the spoken word or the individual speaker. Remote signal processing circuits can be implemented in accordance with the above identified related application wherein the output signals from the formant trackers are characterized and compared with stored information representing a vocabulary of spoken words. Analysis of the formant tracker output signals relative to the stored information produces an indication of the best match between the formant tracker output information and the stored information. This identifies the spoken word or the speaker characteristics stored in the signal processing circuit which most closely approximate the speech input information supplied to the formant tracking circuits.

The formant tracker 10 is not only capable of extracting the formant structure of vowels, but it also reveals characteristic formant positions in voiced consonants. The nasal consonants such as $m$, $n$, the glides $w$, $j$, the semivowels $r$, $l$, and the voiced fricatives v, z, all show some characteristic formant structure, and in the voiced stop consonants, $b$, $d$, $g$ the second formant transistion is the main characteristic that distinguishes them from the unvoiced stops $p,t,k$.

For speech recognition systems that handle a vocabulary of, say 10–20 words or identify one out of a small number of speakers, the formant frequencies (and, for speaker identification, also the pitch frequency) provide sufficient characteristic features for a reliable classification. In this case, four formant trackers as shown in the arrangement of FIG. 9 will be the only feature extractors required. For larger vocabularies, i.e., the identification of one out of a large number of speakers, the characteristic parameters of unvoiced consonants may be required.

Figure 10:
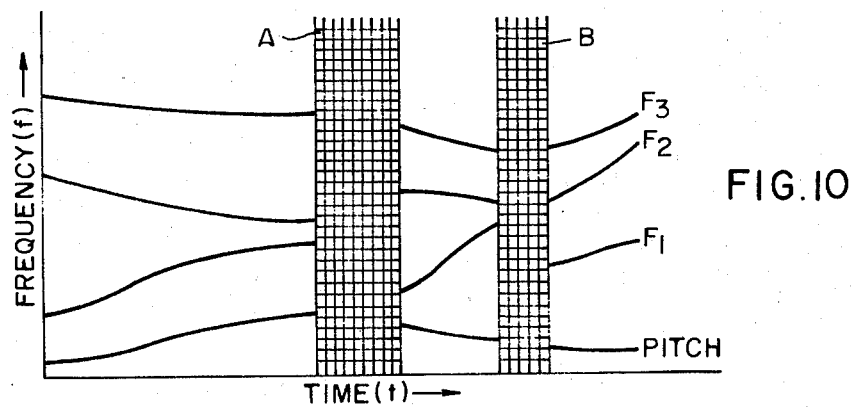
FIG. 10 is a frequency time plot of a sonogram.

The characteristic formant bands that are present in vowels and voiced consonants are illustrated in the sonogram of FIG. 10. The locations of formant bands change with time. The areas identified as A and B contain no such characteristic peaks, but rather consist of a broad spectrum that shows little structure. Such broad spectra are characteristic of unvoiced consonants, such as $p,t,k$.

The waveform illustrations of FIG. 10 correspond to the output signals developed by the integrating circuits of the formant trackers associated with the respective formants and pitch frequency. Each vowel of a spoken word has its own characteristic formant pattern wherein said formant pattern corresponds to the output signal of the tracking circuits, and also each individual person exhibits a formant pattern which is highly characteristic of the individual. Thus, the capability of tracking the formant content of speech information and generating output signals corresponding to this formant content provides the necessary real time information to recognize the word content of the speech information or to identify the particular individual producing the speech information.

The purpose of the formant tracker 10 is to extract characteristic features of phonemes. This feature extraction is required in order to decrease the dimensionality of the recognition space, such that it becomes economically feasible to match the features with a set of stored templates. The number of templates required per word, however, would still be unacceptably large if the word features and their stored counterparts (the templates) were not normalized, i.e., shortened or extended to a predetermined duration. Without normalization a large set of templates would be required for each word, recorded at different talking speeds and including all possible combinations of changes in the duration of individual phonemes. One known techinque to overcome the word duration problem is the concept of the nonlinear time base, described by G. L. Clapper, "Automatic Word Recognition", IEEE Spectrum, Aug., 1971. Another possibility is to classify individual phonemes via the method of binary selection as described in "Electronic Binary Selection System for Phonemes Classification" J. Acoust Soc. Am. 1956.

In the information classification and identification concept disclosed in detail in the above referenced U.S. patent, which concept is equally valid in implementing the signal processing circuits of this invention, the signals from the formant tracker circuits are evaluated by a matrix including a pattern of adaptive memory elements, such as magnetic or solid state memory elements (Minstors) disposed in columns and rows. Characteristics of spoken words of a vocabulary or characteristics of an individual speaker are assigned to the adaptive elements in each column so that each row of adaptive elements corresponds to a set of characteristics. The elements in each row are encoded with a different set of adaptations corresponding to the characteristics which it is anticipated will match the characteristics of the speech information input as provided by the formant tracker circuits. Adaptations derived from the formant tracker output signals, are simultaneously impressed respectively on each column in comparing relationship with the encoded adaptation of the elements. The comparison takes place in real time (instantaneously) for all characteristics. A measure of the total deviation of the characteristics corresponding to the formant tracker output signals from the stored characteristic information is derived for each row. A determination is made as to the identity of the particular characteristics of the formant tracker output as corresponding to the stored information which produced a minimum deviation.

What I claim is:

1. Apparatus for tracking a spectral peak within the frequency spectrum of a spoken word wherein a spectral peak is a frequency which corresponds to a peak amplitude in the spoken word, comprising:

first and second electronically tunable filter means connected to receive spoken words and produce an output signal having an adjustable center frequency and an adjustable Q characteristic, said first tunable filter means responding to the frequency content of spoken words occurring in a frequency range in a first direction from said center frequency and a second tunable filter means responding to the frequency content of spoken words occurring in the frequency range in an opposite direction, said first and second tunable filter means including control inputs to receive control input signals to adjust said center frequencies and said Q characteristics, and feedback control means connected to the outputs of said first and second tunable filter means to determine the deviation of said center frequencies from a spectral peak in said spoken word and develop a control input signal to adjust said center frequencies to establish a predetermined relationship between said center frequencies and spectral peak.

2. Apparatus for tracking a spectral peak within a frequency spectrum of an input signal wherein a spectral peak is a frequency which corresponds to a peak amplitude in the input signal, comprising, tunable filter means exhibiting first and second transfer functions including intersecting frequency response curves and an adjustable characteristic frequency associated with each frequency response curve, said tunable filter means including an input to receive an input signal having a spectral peak, an output for producing a first output signal corresponding to said first transfer function and indicative of the deviation of said spectral peak from the intersection of said frequency response curves and a second output signal corresponding to said second transfer function and indicative of the deviation of said spectral peak from said intersection, and a control input to receive a control input signal to adjust said characteristic frequencies, and feedback control means operatively connected between said outputs and said control input to respond to said first and second output signals by developing a control input signal to adjust said characteristic frequencies to maintain substantial coincidence between said intersection and said spectral peak, said control input signal being indicative of said spectral peak.

3. Apparatus as claimed in claim 2 wherein said frequency response curves of said first and second transfer functions correspond to the combination of, two bandpass frequency response curves, low pass and bandpass frequency response curves, high pass and bandpass frequency response curves, or high pass and low pass frequency response curves.

4. Apparatus as claimed in claim 2, further including means operatively connected to said tunable filter means to render said tunable filter means responsive to the lowest frequency spectral peak present within said input signal.

5. Apparatus for tracking a spectral peak within a frequency spectrum of an input signal wherein a spectral peak is a frequency which corresponds to a peak amplitude in the input signal, comprising, tunable filter means exhibiting first and second transfer functions including intersecting frequency response curves and an adjustable characteristic frequency associated with each frequency response curve, said tunable filter means including an input to receive an input signal having a spectral peak, an output for producing a first output signal corresponding to said first transfer function and indicative of the deviation of said spectral peak from the intersection of said frequency response curves and a second output signal corresponding to said second transfer function and indicative of the deviation of said spectral peak from said intersection, and a control input to receive a control input signal to adjust said characteristic frequencies, and feedback control means operatively connected between said output and said control input to respond to said first and second output signals by developing a control input signal to adjust said characteristic frequencies to maintain substantial coincidence between said intersection and said spectral peak, said control input signal being indicative of said spectral peak, wherein said tunable filter means further include a second control input adapted to respond to second control input signals by adjusting the bandwidth of said transfer functions, said feedback control circuit means providing said second control input signal to said second control input to reduce the bandwidth of said transfer functions when substantial coincidence occurs between the intersection of said frequency response curves and said spectral peak.

6. Apparatus as claimed in claim 2 wherein said tunable filter means consists of a combination of two electronically tunable filters represented by two bandpass filters, a bandpass and a low pass filter, a bandpass and a high pass filter, or a high pass and a low pass filter.

7. Apparatus as claimed in claim 2 wherein said spectral peak corresponds to a formant in a spoken word, said control signal causing said tunable filter means to track said formant, said control signal being indicative of said formant.

8. Apparatus as claimed in claim 2 wherein said feedback circuit includes an integrator to bridge discontinuities occurring in the spectral peak.

9. Apparatus as claimed in claim 7, further including signal processing means operatively connected to said feedback circuit means to analyze said control signal as a representation of a formant.

10. Apparatus for locating and tracking each of a plurality of spectral peaks occurring in the frequency spectrum of input information wherein a spectral peak is a frequency which corresponds to a peak amplitude in the input information, comprising
 a. a plurality of serially connected spectral peak tracking stages, each of said tracking stages including:
  1. tunable filter means exhibiting first and second transfer functions including intersecting frequency response curves and an adjustable characteristic frequency associated with each frequency response curve, said tunable filter means including an input to receive an input signal having a spectral peak, an output for producing a first output signal corresponding to said first transfer function and indicative of the deviation of said spectral peak from the intersection of said frequency response curves and a second output signal corresponding to said second transfer function and indicative of the deviation of said spectral peak from said intersection, and a control input to receive a control input signal to adjust said characteristic frequencies;
  2. feedback control means operatively connected between said output and said control input to respond to said first and second output signals by developing a control input signal to adjust said characteristic frequencies to establish substantial coincidence between said intersection and said spectral peak, said control input signal being indicative of said spectral peak;
  3. circuit means operatively connected to said tunable filter means to render said tunable filter means responsive to the lowest spectral peak in the input signal; and
 b. circuit means for removing the spectral peak monitored by a preceding spectral peak tracking stage from the input signal supplied to a subsequent spectral peak tracking stage.

11. Apparatus as claimed in claim 10 wherein said input information corresponds to spoken words and said spectral peaks correspond to formants and pitch frequencies, including signal processing means operatively connected to said spectral peak tracking stages to monitor said control signals developed within each of said spectral peak tracking stages and analyze the spoken word information represented by said spectral peaks.

12. Apparatus as claimed in claim 10, wherein the frequency response curves of said first and second transfer functions correspond to the combination of two bandpass frequency response curves, low pass and bandpass frequency response curves, high and bandpass frequency response curves, or high pass and low pass frequency response curves.

* * * * *